United States Patent
Mukainakano

(10) Patent No.: US 6,265,848 B1
(45) Date of Patent: Jul. 24, 2001

(54) BATTERY STATE MONITORING CIRCUIT AND BATTERY DEVICE

(75) Inventor: Hiroshi Mukainakano, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/294,467

(22) Filed: Apr. 20, 1999

(51) Int. Cl.$^7$ ................................................ H02J 7/00
(52) U.S. Cl. .................................. 320/132; 307/66
(58) Field of Search .............................. 320/132; 307/43, 307/66, 125, 130

(56) References Cited

U.S. PATENT DOCUMENTS 4,178,893 * 12/1979 Aoki .................................. 123/117 D
5,352,970 * 10/1994 Armstrong, II ........................ 320/39
5,414,378 * 5/1995 Edgar et al. ........................... 327/143

FOREIGN PATENT DOCUMENTS 9-312172 * 12/1997 (JP) .............................. H01M/10/44

* cited by examiner

Primary Examiner—Shawn Riley
Assistant Examiner—Gregory J. Toatley
(74) Attorney, Agent, or Firm—Adams & Wilks

(57) ABSTRACT

In a battery state monitoring circuit including a voltage regulator therein, power supply of the voltage regulator is applied from a higher voltage either of a battery or a charger. Also, when the output voltage of the voltage regulator becomes lower, there is structured such as to provide a voltage detecting circuit that sends a signal to the microcomputer.

17 Claims, 7 Drawing Sheets

BATTERY STATE MONITORING CIRCUIT AND BATTERY DEVICE

BACKGROUND OF THE INVENTION

The present invention relates to a battery device (hereinafter, referred to as "battery pack") including a circuit required to be monitored for a battery state such as a voltage or a charge/discharge current, a battery state monitoring circuit for monitoring the circuit, an external connection terminal for connection to a device outside of the battery device, a switch element, a secondary battery and a sense resistor in a battery pack for a secondary battery.

As a conventional battery state monitoring circuit, there has been known a device shown in a circuit block diagram of FIG. 2. For example, Japanese Patent Application Laid-open No. Hei 9-312172, entitled "Battery pack, charger and charging system as well as charging method", discloses a structure of this type. This is directed to a battery pack which is commonly called a "smart battery system" or the like. That is, this is a battery pack 100a having a function of monitoring a voltage and charge/discharge current of the secondary battery by use of a microcomputer 5a, and communicating with a load such as a charger 17 or a computer through terminals 101, 102.

Employing the battery pack 100a thus structured, it is possible to recognize a battery state by communication with the charger 17, the microcomputer within a personal computer, a load 16 or the like. The use of this information allows an indication of the residual amount of the battery, a suspension of battery charge, etc., to be conducted accurately. In the case where a lithium ion battery is used as a secondary battery, since a self-protecting action is not provided, unlike that of a nickel cadmium battery, an over-charge protecting circuit is required. That is, the lithium ion battery is provided with a circuit for detection of a battery voltage and a switch element for suspending a charging operation from the outside.

In the battery pack 100a thus structured, a microcomputer 5a is used. The battery pack 100a is also equipped with an amplifier 3a for monitoring a battery voltage and a sense resistor 10 and an amplifier 3b for monitoring a charge/discharge current. To the microcomputer 5a is supplied electric signals from a battery voltage monitor circuit 20a and amplifiers 3a, 3b. Since the microcomputer 5a has a calculating function and an A/D converter so that it can calculate the voltage and the capacity of the secondary batteries 6 to 8 from the above-described signals, it can monitor a battery state. This makes it possible for the microcomputer 5a to control the on/off state of the switch elements 11a and 11b, and therefore the microcomputer 5a provides safety with respect to over-charging of the battery pack in which a lithium ion battery is used.

It is necessary for a constant voltage to be provided as a power supply of the microcomputer 5a which is a structurally important part. For example, a voltage of 3.3 V or 5.0 V is a normal value. If the supply voltage applied to the microcomputer 5a is unstable, the detection accuracy of the battery voltage, etc., are degraded. In the worst case, there generally occurs a phenomenon called "runaway" of the microcomputer 5a. This creates an environment in which the microcomputer 5a is not controlled at all, with the result that the safety of the battery pack 100a is not assured at all. In addition, it is desirable for a constant voltage to be applied to the battery voltage monitoring circuit 20a and the amplifiers 3a, 3b for their safe operation.

Because the power supply for the battery state monitoring circuit 18a within the battery pack 100a is made up of the secondary batteries 6 to 8, the voltage is varied according to the load state. In the case where the battery pack 100a is discharged to the load, the supply voltage becomes low, whereas in the case where the battery pack 100a is charged, the supply voltage becomes high. In order to apply a constant voltage to the microcomputer 5a and the amplifier 3a,3b equipped within the battery pack 100a, a voltage regulator is disposed within the battery pack. The voltage regulator serves to maintain a constant output voltage constant even if the supply voltage is varied.

SUMMARY OF THE INVENTION

However, even if the voltage regulator is disposed in this manner, the battery voltage as the power supply becomes low if the discharging continues. As the supply voltage of the voltage regulator becomes lower, the output voltage naturally becomes lower. In this state, a supply voltage required for stable operation of the microcomputer cannot be applied. Thus, there is a problem in that when the supply voltage to the microcomputer becomes low, runaway of the microcomputer may occur, thereby rendering the apparatus unable to monitor the battery state.

FIG. 4 is a diagram for explaining the operation described above. In the figure, the abscissa represents time whereas the ordinate represents voltage, and the battery voltage and the output voltage of the voltage regulator (supply voltage of the microcomputer) are shown. During a time period from time 0 to time ta, a current is supplied to a load from a battery pack, and the battery voltage drops as time elapses. At time ta, the battery voltage becomes equal to the output voltage of the voltage regulator.

After time ta, the output voltage of the voltage regulator becomes lower than a predetermined value. Although FIG. 4 shows that the output voltage of the voltage regulator is identical with the battery voltage after the time ta, this is to simplify the description. In fact, the output voltage becomes lower than the battery voltage. At time tb, the supply of current from the battery pack to the load is suspended, and a charger is connected to the battery pack. With the charger being connected to the battery pack, the battery voltage starts to rise, and then becomes identical with the output voltage set by the voltage regulator at a time period tc. After the time period tc, the output voltage of the voltage regulator becomes constant.

In the example of FIG. 4, because the output voltage of the voltage regulator, that is, the supply voltage of the microcomputer, drops during the period of time from time ta to time tc, stable operation of the microcomputer is not assured, and the battery state cannot be accurately monitored.

This problem arises even in actual use. The operation of the microcomputer becomes unstable a period of time from that when the battery voltage becomes lower, with the load being connected to the battery pack, and the output voltage value of the voltage regulator is reduced to the battery supply voltage or lower; and the microcomputer stably operates when the battery voltage rises to the supply voltage or higher, where the microcomputer stably operates with the charger being connected to the battery pack. The safety of the battery pack during the period of time when the battery power is reduced below a sufficient level is not assured at all.

In view of the above, in order to solve the above-mentioned problems inherent in the prior art, an object of the present invention is to enable runaway of a microcomputer to be prevented by supplying a constant voltage of a sufficient level to the microcomputer so that the battery state can be monitored in a wide range, as well as the safety of a battery pack is enhanced.

In order to solve the above problems, according to the present invention, in a battery state monitoring circuit including an internal voltage regulator, a power supply of the voltage regulator is selected as the higher voltage of a secondary battery and an external charger. Also, when the output voltage of the voltage regulator becomes lower, a voltage detecting circuit for sending a signal to the microcomputer is further provided.

In a battery state monitoring circuit having the internal voltage regulator, the power supply of the voltage regulator is a voltage provided by a circuit that selects a higher voltage of either a battery or a charger. Also, when the output voltage of the voltage regulator becomes lower than the minimum stable operating voltage of the microcomputer, a constant voltage can be supplied to a microcomputer by an addition of a voltage detecting circuit that sends a signal to the microcomputer, thereby being capable of preventing runaway. Since this structure increases the operating range of the microcomputer, the safety of the battery pack is enhanced, and the monitoring of the battery state is accurately conducted, thereby providing the capability of obtaining reliable information from the battery pack.

DESCRIPTION OF THE PREFERRED EMBODIMENTS

Figure 1:
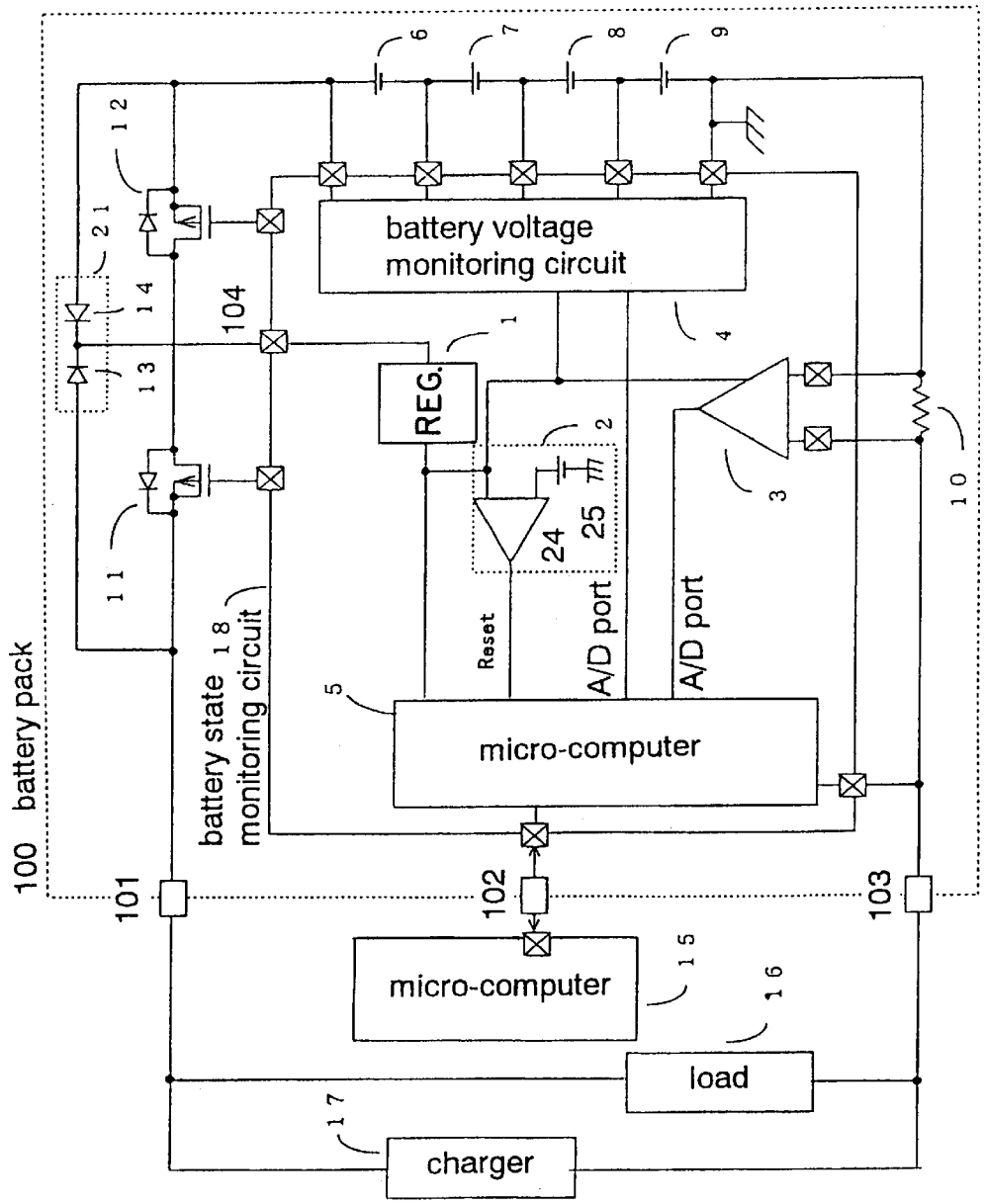
FIG. 1 is a diagram showing a battery state monitoring circuit in accordance with the present invention and a battery pack using the same.
Figure 2:
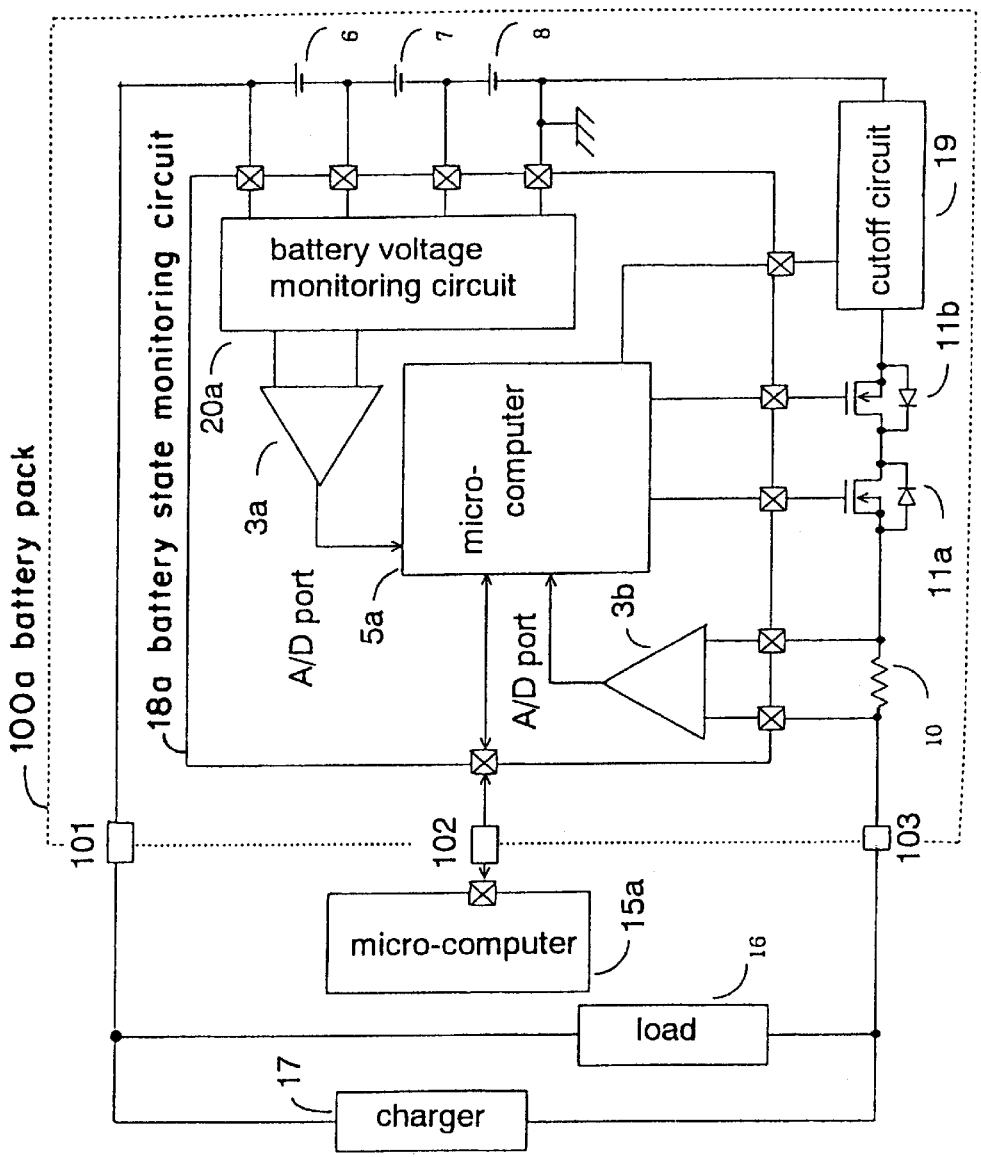
FIG. 2 is a diagram showing a conventional battery state monitoring circuit and a battery pack using the same.

FIG. 1 shows a battery state monitoring circuit to which the present invention is applied, and a structural example of a battery pack using this circuit. Hereinafter, an embodiment of the present invention will be described with reference to FIG. 1.

The battery pack 100 is designed such that a plurality of secondary batteries 6 to 9 (for example, cells of a lithium ion battery) are connected in series. A negative pole of the secondary battery 9 is connected to a sense resistor 10. Furthermore, the sense resistor 10 is connected to negative terminal 103 of the battery pack 100. A positive pole of the secondary battery 6 is connected to a switch element 12 made up of an FET and the like. The switch element 12 and a switch element 11 are connected in series, and the switch element 11 is connected in series to a positive terminal of the battery pack 100. The switch elements 12 and 11 are used as switch elements for controlling discharge from the battery pack 100 and the charge from a charger 17. When the charge to the battery pack 100 is inhibited, the switch element 11 may be turned off. Also, when the discharge from the battery pack 100 is inhibited, the switch element 12 may be turned off. The switch elements 11, 12 may alternatively be connected between the negative pole of the secondary battery 9 and a sense resistor 10. In such case, it is necessary for the type of FETs, etc., to be appropriately changed according to this structure. Likewise, the sense resistor 10 may be connected to the positive terminal 101 side of the battery pack 100.

The power supply terminal 104 of the battery state monitoring circuit 18 is connected with a voltage switch-over unit 21. In the embodiment shown in FIG. 1, the voltage switch-over unit 21 is made up of a diode 13 and a diode 14. In this case, cathodes of the diode 13 and the diode 14 are connected at a common point. The anode of the diode 13 is connected to the positive terminal 101 of the battery pack 100, and the anode of the diode 14 is connected to the positive pole of the secondary battery 6. The voltage at the positive pole of the secondary battery 6 becomes a value obtained by adding the battery voltages of the secondary batteries 6 to 9 together (hereinafter the voltage at this point being referred to as "total battery voltage"). With this connection, the higher voltage of the positive terminal 101 of the battery pack 100 and the total battery voltage is applied to the power supply terminal of the battery state monitoring circuit 18. That is, the higher voltage of the voltage of the charger connected to the positive terminal 101 of the battery pack 100 and the voltage of the secondary battery 6 is selected to be applied to the power supply terminal 104 of the battery state monitoring circuit 18.

The conventional structure in which the power supply terminal 104 of the battery state monitoring circuit 18 is derived exclusively from the secondary battery 6 to 9 suffers from a problem in that when the voltage of the secondary battery 6 to 9 is low, circuit operation becomes unstable. When the voltage of the secondary battery 6 to 9 becomes lower, the power supply voltage of the battery state monitoring circuit 18 cannot be ensured even if the charger 17 is connected to the battery state monitoring circuit 18. Since the output of the voltage regulator 1 is not stabilized until the secondary battery 6 to 9 is charged and the voltage rises, the charge current cannot be monitored during this period with the result that the precision of indicating the residual of the battery capacity becomes degraded.

However, when the circuit is structured using the voltage change-over unit 21 as described above, when the voltage of the secondary battery 6 to 9 is low, the voltage applied as a power supply voltage to the battery state monitoring circuit 18 is derived from the charger 17. For this reason, the voltage regulator 1 and the amplifier 3 can operate normally immediately after the charger is connected thereto, to thereby improve the battery state monitoring accuracy.

Figure 6:
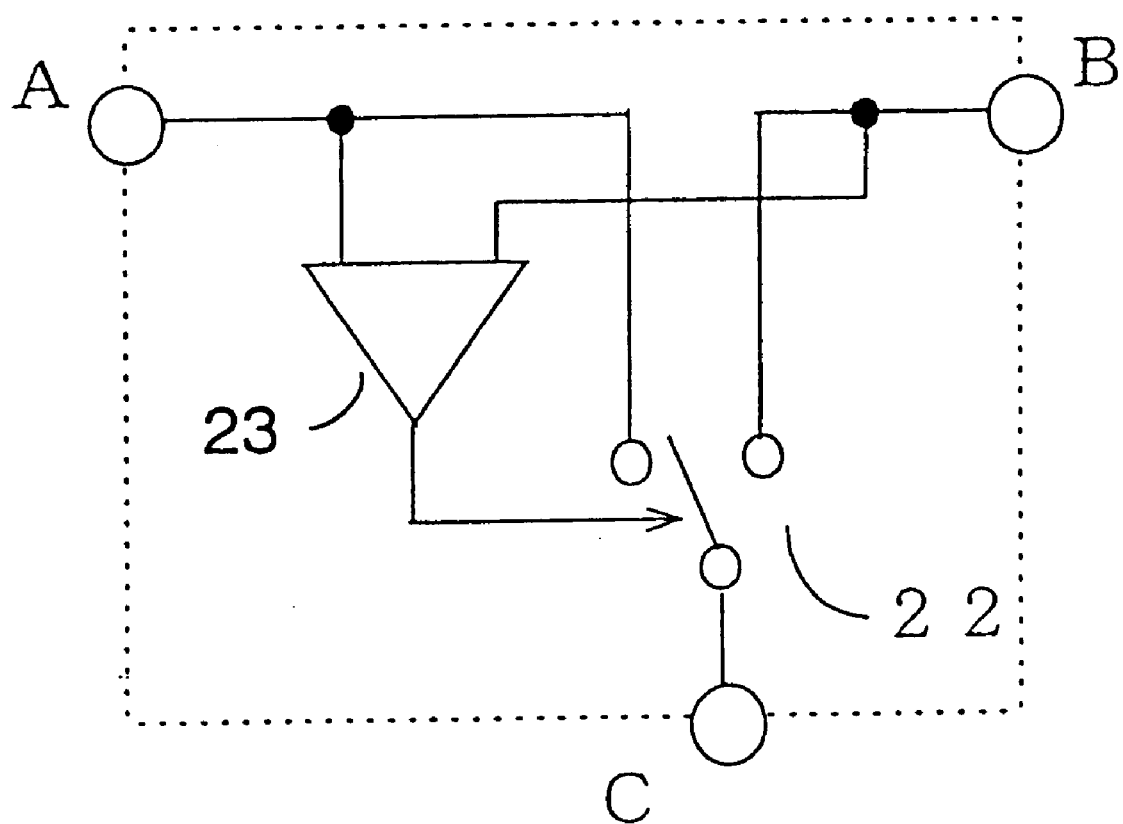
FIG. 6 is a diagram showing another example of a voltage change-over circuit in accordance with the present invention.

Another example of the voltage switch-over unit 21 is shown in FIG. 6. In this example, when the power supply is connected to the respective terminals A and B, the higher voltage of voltages at terminals A and B is output to a terminal C. In this example, although the voltage change-over unit 21 is made up of a comparator 23 and a switch 22, it is not limited to this circuit structure, and all circuits capable of realizing the above-described function may be used.

The secondary batteries 6 to 9, the switch elements 11, 12, the sense resistor 10 and the voltage change-over unit 21 are also connected to the battery state monitoring circuit 18, respectively. The battery state monitoring circuit 18 is made up of the microcomputer 5, the battery voltage monitoring circuit 4, the amplifier 3, the voltage regulator 1, and the voltage detecting circuit 2. The power supply of the battery voltage monitoring circuit 4, the amplifier 3, the voltage regulator 1, and the voltage detecting circuit 2, etc., is the output of the voltage regulator 1.

The battery voltage monitoring circuit 4 is a circuit consisting of, for example, a multiplexer and an amplifier, which transforms the respective voltages of the secondary batteries 6 to 9 to voltages readable by the microcomputer and applies them to an A/D port. In the embodiment of FIG. 1, the battery voltage monitoring circuit 4 is formed of a circuit in which the respective voltages of the secondary batteries 6 to 9 are sequentially output on one signal line. The power supply of the battery voltage monitoring circuit 4 provided by the voltage regulator 1. The circuit is arranged in such a manner that even if the voltage of the secondary battery 6 to 9 is low, the battery voltage monitoring circuit 4 operates normally immediately after the charger 17 is connected to the battery pack.

The amplifier 3 is designed to adjust a voltage drop occurring across the sense resistor 10 to a level readable by the microcomputer 5. Since the resistance value of the sense resistor 10 is generally on the order of several tens of mΩ, the amplifier 3 amplifies the voltage between the sense resistor terminals and supplies the amplified voltage to the A/D port of the microcomputer 5. The power supply of the amplifier 3 is also provided by the voltage regulator 1.

The microcomputer 5 has A/D conversion and calculation functions, etc., and also communicates with the outside of the battery pack 100. The A/D port of the microcomputer 5 is supplied with a signal output by the battery voltage monitoring circuit 4. In the case where the secondary battery 6 to 9 is formed of a lithium ion battery, there is a fear that ignition would occur, or the like when the battery voltage value becomes too high. That is, it is necessary to monitor the battery voltage and suspend the charge to the battery pack 100. In this case, the microcomputer 5 controls the on/off operation of the switch elements 11 and 12 in accordance with the voltage of the secondary battery cells 6 to 9. Also, the charge/discharge current of the secondary cells 6 to 9 can be calculated by monitoring the voltage drop across the sense resistor 10. Since the charge/discharge current can be calculated, the capacity of the battery pack can be determined.

The supply voltage of the microcomputer 5 is produced by the voltage regulator 1. The voltage regulator 1 is designed to maintain a constant output voltage even if the supply voltage is changed. In the embodiment of FIG. 1, the power supply of the voltage regulator 1 is selected from the higher voltage of the positive terminal 101 of the battery pack 100 and the total battery voltage as described above. When the charger 17 is not connected to the battery pack 100, the supply voltage of the voltage regulator 1 also drops as the total battery voltage drops.

The output of the voltage regulator 1 is connected with the voltage detecting circuit. The voltage detecting circuit 2 is comprised of, for example, a comparator 24 and a reference voltage 25, and when the input voltage reaches to set minimum voltage, the output voltage is varied. In FIG. 1, when the output voltage of the voltage regulator 1 becomes lower than the minimum set voltage, the output of the voltage detecting circuit 2 is changed. When the output changes, the microcomputer 5 suspends calculation functions and the like, thereby being capable of preventing the malfunction in advance. This control method is commonly called "reset".

Figure 5:
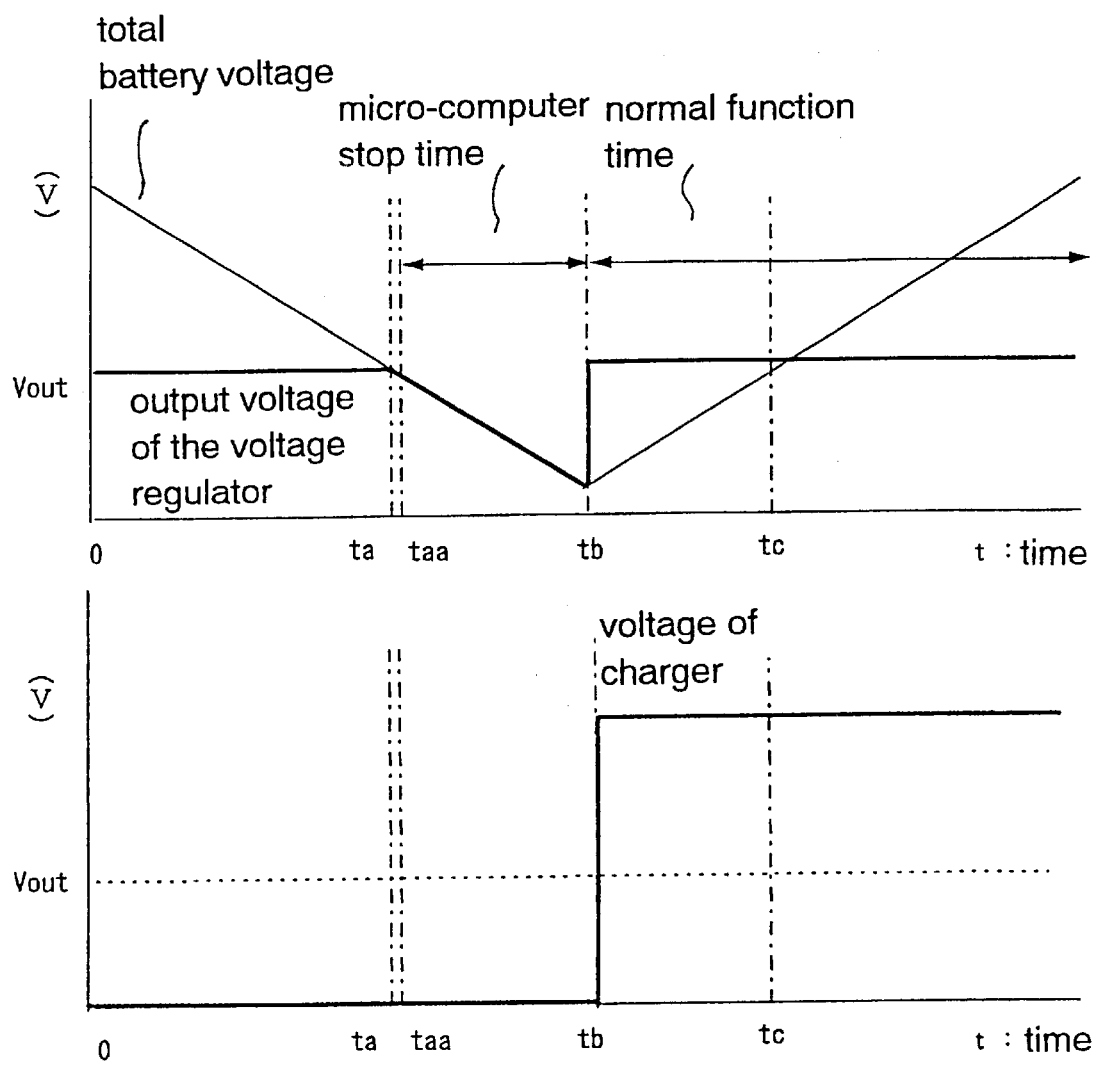
FIG. 5 shows timing charts of the battery state monitoring circuit in accordance with the present invention and a battery pack using the monitoring circuit, respectively.

Subsequently, operation of the battery pack of this embodiment of the present invention will be described with reference to FIG. 5. In the figure, the abscissa represents time, whereas the ordinate represents voltage, and the total battery voltage and the supply voltage of the microcomputer 5 are shown. During a time period from time 0 to time ta, a current is supplied to a load 16 from a battery pack 100, and the total battery voltage drops as time elapses. At the time period ta, the total battery voltage becomes equal to the output voltage of the voltage regulator 1. At a time taa, the output voltage of the voltage regulator 1 reaches the detection voltage of the voltage detecting circuit 2. At this time, since the output voltage of the voltage detecting circuit 2 is changed so that the microcomputer 5 is reset, there is no case where the microcomputer 5 malfunctions. Since the microcomputer 5 receives this signal and also can inhibit the discharge from the battery pack 100 and the charge from the outside, the safety of the battery pack 100 is ensured. As the discharge from the battery pack 100 to the load 16 continues, the total battery voltage drops. At a time tb, the supply of a current from the battery pack 100 to the load 16 is suspended, and the charger 17 is connected to the battery pack 100. In the battery pack 100 structured as shown in FIG. 1, a voltage is applied to the power supply terminal 104 of the battery state monitoring circuit 18 immediately after the charger 17 is connected to the battery pack 100. If the voltage of the charger 17 is higher than the output voltage set onto the voltage regulator 1, the voltage regulator 1 applies the power supply to the microcomputer immediately after the charger is connected to the battery pack 100.

In the conventional example, the microcomputer 5 malfunctions during a time period from time tb to time tc, whereas in this embodiment, the power supply is applied so that the microcomputer 5 normally operates from the time tb where the charger is connected to the battery pack. Also, during the period of time taa to time tb, since the microcomputer 5 receives a reset signal, the microcomputer 5 does not malfunction, and the safety of the battery pack 100 is ensured.

Figure 3:
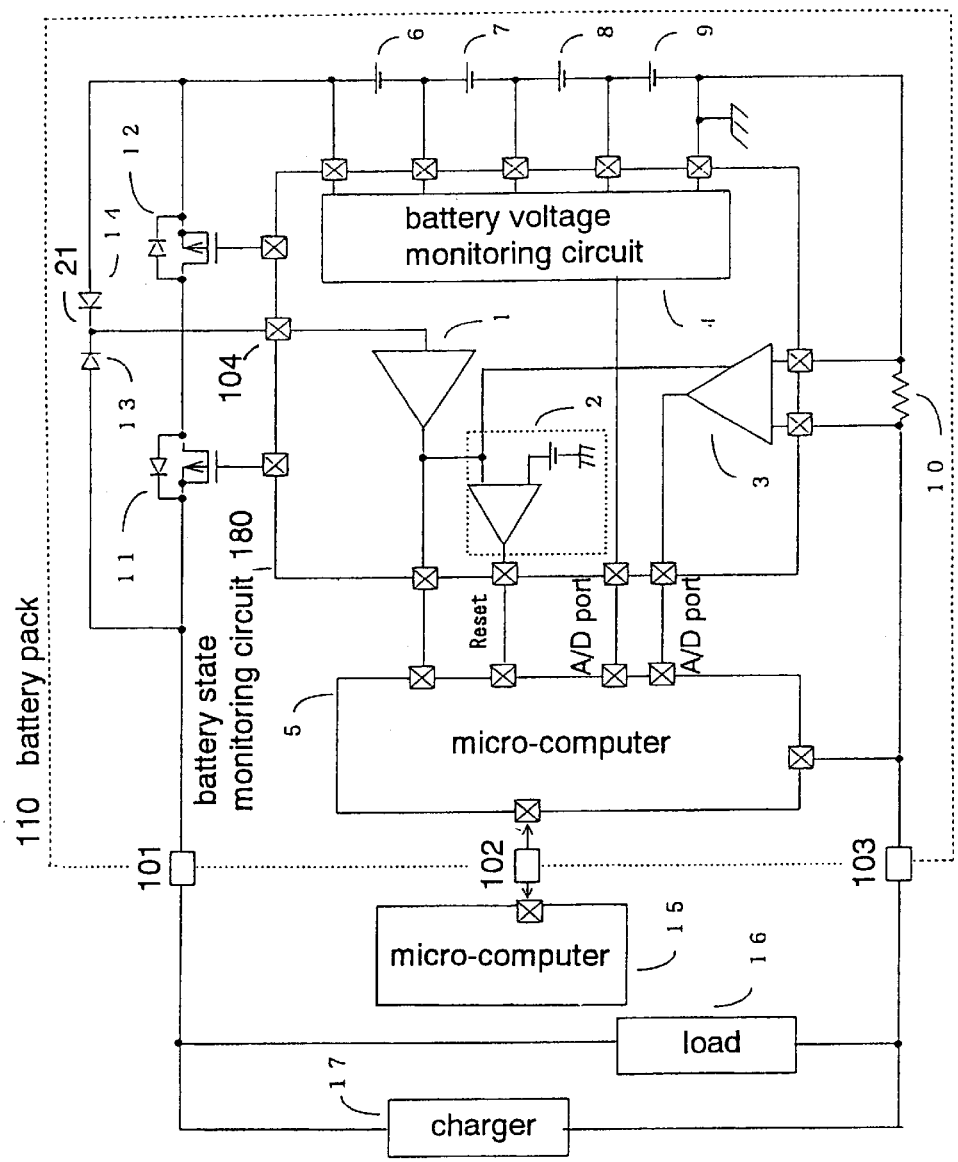
FIG. 3 is a diagram showing another example of a battery state monitoring circuit in accordance with the present invention and a battery pack using the same.
Figure 4:
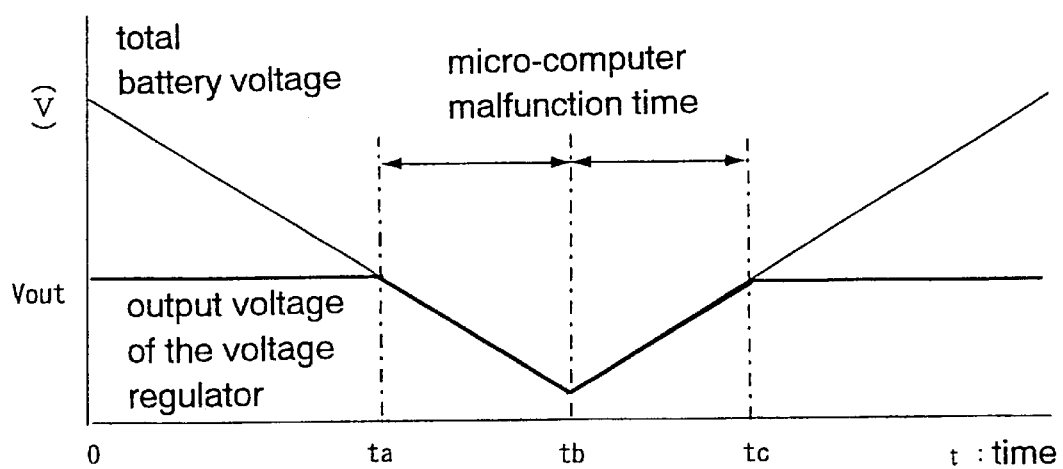
FIG. 4 is a timing chart of the conventional battery state monitoring circuit and the battery pack using the same.

FIG. 3 shows another embodiment of the present invention. In this embodiment, the microcomputer 50 and the battery state monitoring circuit 180 are structured as different parts. The structural elements and the operation principle are entirely identical with those in the embodiment described with reference to FIG. 1. In this way, the battery pack according to the present invention is effective even if all of functions are provided in one part (IC), and the same effect is obtained even if a plurality of parts are provided by mounting the microcomputer 50, the switch elements 11, 12, etc., on a substrate.

Figure 7:
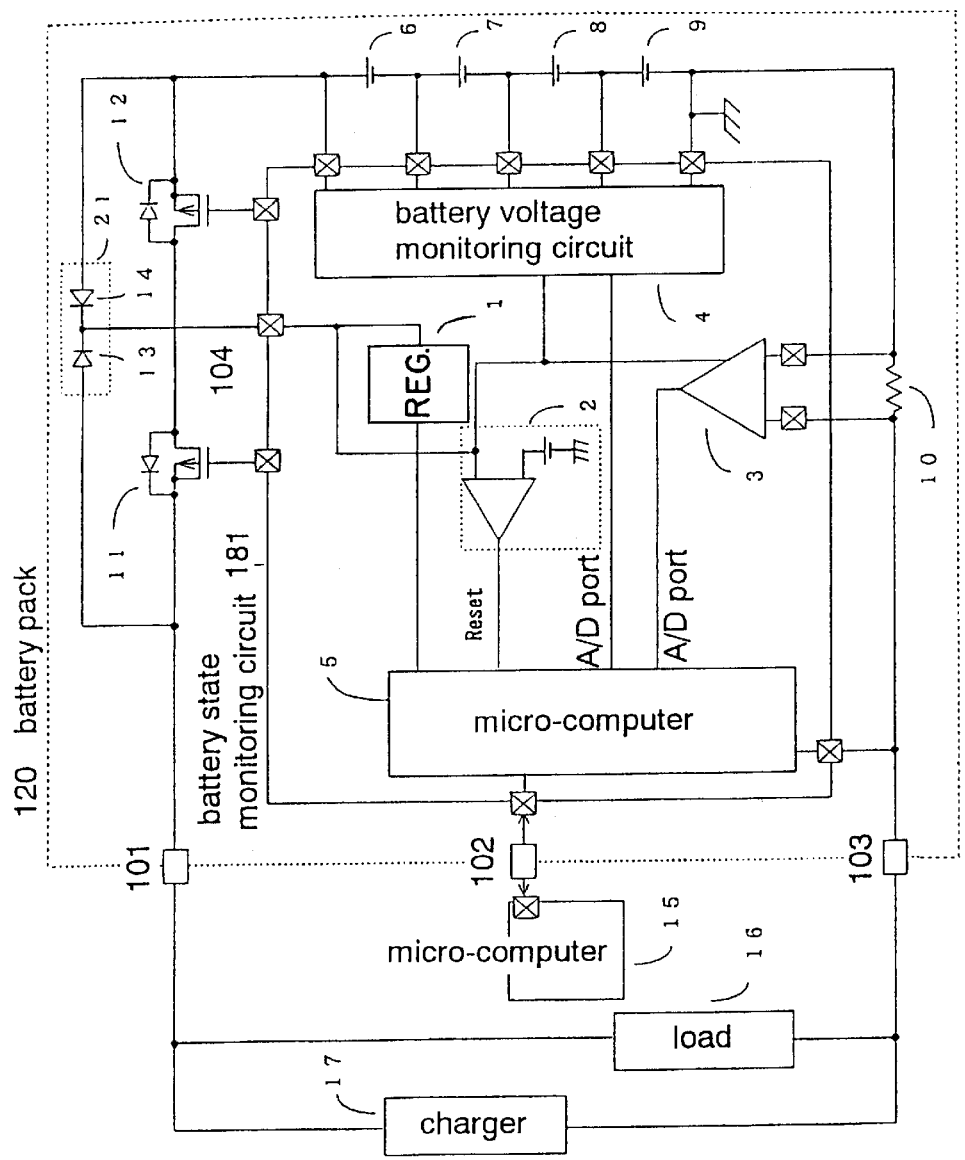
FIG. 7 is a diagram showing still another example of a battery state monitoring circuit in accordance with the present invention and a battery pack using the same.

In the embodiment of FIG. 7, the power supply of the battery voltage monitoring circuit 4, the amplifier 3, the voltage regulator 1, the voltage detecting circuit 2 and so on is applied from the voltage change-over unit 21. Even with this structure, it acts as the power supply to the microcomputer, and it is apparent that the operation described above is carried out.

In the embodiment modes shown in FIGS. 1, 3 and 7, the structural examples in which the respective secondary batteries 6 to 9 are not connected in parallel are described. However, the present invention is similarly applicable to a case in which charge/discharge control is made to the structure where a plurality of secondary batteries are connected in parallel.

According to the present invention, as described above, a constant voltage can be surely applied to the microcomputer only with an addition of a simple circuit, and since runaway can be prevented to widen the operation range of the microcomputer, the safety of the battery pack is enhanced, and the battery state monitoring is accurately conducted, thereby obtaining information high in quality.

What is claimed is:

1. A battery state monitoring circuit for a portable electronic device, comprising:

an external connection terminal connectable to a secondary battery, to an external load driveable by the secondary battery, to an external charger for charging the secondary battery, and to at least one switch element connected between the secondary battery and the external connection terminal;

a control circuit for controlling the charge/discharge state of the secondary battery by controlling the on/off state of the at least one switch element; a monitoring circuit for monitoring at least one of a voltage and a discharge current of the secondary battery;

a voltage change-over circuit connectable to the secondary battery, the external connection terminal, and the monitoring circuit for supplying a power supply voltage to at least the monitoring circuit by selecting the higher voltage of a voltage at the external connection terminal and the secondary battery voltage;

a voltage regulator connected to an output of the voltage change-over circuit for supplying a regulated voltage to at least the monitoring circuit; and a circuit for suspending operation of the monitoring circuit when an output voltage of the voltage regulator is below a predetermined level adequate to ensure stable operation of the monitoring circuit so that the monitoring circuit is operative only when the selected power supply voltage supplied thereto is higher than the predetermined level;

wherein the monitoring circuit controls the at least one switch element so that the secondary battery is disconnected from the external connection terminal when the selected power supply voltage is lower than the predetermined level.

2. A battery state monitoring circuit according to claim 1; wherein the voltage change-over circuit comprises a first diode having an anode connected to the external connection terminal and a cathode connected to at least the monitoring circuit, and a second diode having an anode connected to the secondary battery and a cathode connected to a power input terminal of the monitoring circuit, so that cathodes of the first and second diodes are connected to each other and the higher voltage of a voltage applied to the external connection terminal by the charger and the voltage of the secondary battery is supplied to the power input terminal of the monitoring circuit.

3. A battery state monitoring circuit according to claim 1; wherein the voltage change-over circuit comprises a comparing circuit for comparing a voltage at the external connection terminal with a voltage of the secondary battery and producing an output signal in accordance with the comparison result, and a switch element for connecting one of the voltage at the external connection terminal and the voltage of the secondary battery as a supply voltage to at least the monitoring circuit in accordance with the output signal of the comparing circuit.

4. A battery state monitoring circuit according to claim 1; wherein the monitoring circuit comprises a processing circuit for processing at least one of the voltage and the charge/discharge current of the secondary battery and controlling the switch in accordance therewith.

5. A battery state monitoring circuit according to claim 4; wherein the monitoring circuit further comprises a sense resistor connected to the secondary battery for converting a current output by the secondary battery into a voltage, and an amplifier for amplifying the voltage across the resistor to a desired level, an output of the amplifier being supplied to the processing circuit to monitor the charge/discharge current of the secondary battery.

6. A battery state monitoring circuit according to claim 4; wherein the monitoring circuit further comprises an amplifier for amplifying the secondary battery voltage to a desired level and supplying an amplified output voltage to the processing circuit for monitoring the voltage of the secondary battery.

7. A battery state monitoring circuit according to claim 6; wherein the secondary battery comprises a plurality of secondary batteries connected in series, and the monitoring circuit further comprises a multiplexer connected to the amplifier for selectively monitoring the voltage of the respective secondary batteries.

8. A battery state monitoring circuit according to claim 1; wherein the monitoring circuit comprises a battery voltage detecting circuit for detecting a voltage of the secondary battery, a current detecting circuit for detecting a current of the secondary battery, and a processing circuit receptive of outputs of the voltage detecting circuit and the current detecting circuit for outputting a signal for controlling the at least one switch element for controlling the charge/discharge state of the secondary battery in accordance with the detected voltage and current.

9. A battery device for a portable electronic device, comprising:

external connection terminals; a secondary battery connected in series with at least one of the external connection terminals, the external connection terminals comprising a plus terminal and a minus terminal of the battery device;

at least one switch element connected between the secondary battery and at least one of the external connection terminals, the on/off state of the at least one switch element controlling a voltage and a charge/discharge current of the secondary battery;

a monitoring circuit for monitoring at least one of the voltage and the charge/discharge current of the secondary battery;

a voltage change-over circuit for providing a power supply voltage to at least the monitoring circuit by selecting the higher voltage of the voltage between the plus terminal of the battery device and the switch element and the secondary battery voltage;

a voltage regulator connected to an output of the voltage change-over circuit for supplying a regulated voltage to at least the monitoring circuit;

and a circuit for suspending operation of the monitoring circuit when an output voltage of the voltage regulator is too low to ensure stable operation of the monitoring circuit so that the monitoring circuit is operative only when the selected power supply voltage supplied thereto is higher than the predetermined level;

wherein the monitoring circuit controls the at least one switch element so that the secondary battery is disconnected from the external connection terminal when the selected power supply voltage is lower than the predetermined level.

10. A battery device according to claim 9; wherein the voltage change-over circuit comprises a first diode having an anode connected to one of the external connection terminals and a cathode connected to at least the monitoring circuit, and a second diode having an anode connected to the secondary battery and a cathode connected to a power input terminal of the monitoring circuit, so that cathodes of the first and second diodes are connected to each other and the higher voltage of a voltage applied to the one external connection terminal by a charger and the voltage of the secondary battery is supplied to the power input terminal of the monitoring circuit.

11. A battery device according to claim 9; wherein the voltage change-over circuit comprises a comparing circuit for comparing a voltage at one of the external connection terminals with a voltage of the secondary battery and producing an output signal in accordance with the comparison result, and a switch element for connecting one of the voltage at the one external connection terminal and the voltage of the secondary battery as a supply voltage to at least the monitoring circuit in accordance with the output signal of the comparing circuit.

12. A battery device according to claim 9; wherein the monitoring circuit comprises a processing circuit for processing at least one of the voltage and the charge/discharge current of the secondary battery and controlling the switch in accordance therewith.

13. A battery device according to claim 12; wherein the monitoring circuit further comprises a sense resistor connected to the secondary battery for converting a current output by the secondary battery into a voltage, and an amplifier for amplifying the voltage across the resistor to a desired level, an output of the amplifier being supplied to the processing circuit to monitor the charge/discharge current of the secondary battery.

14. A battery device according to claim 12; wherein the monitoring circuit further comprises an amplifier for amplifying the secondary battery voltage to a desired level and supplying an amplified output voltage to the processing circuit for monitoring the voltage of the secondary battery.

15. A battery device according to claim 14; wherein the secondary battery comprises a plurality of secondary batteries connected in series, and the monitoring circuit further comprises a multiplexer connected to the second amplifier for selectively monitoring the voltage of the respective secondary batteries.

16. A battery device according to claim 9; wherein the monitoring circuit comprises a battery voltage detecting circuit for detecting a voltage of the secondary battery, a current detecting circuit for detecting a current of the secondary battery, and a processing circuit receptive of outputs of the voltage detecting circuit and the current detecting circuit for outputting a signal for controlling the at least one switch element for controlling the charge/discharge state of the secondary battery in accordance with the detected voltage and current.

17. A battery state monitoring circuit for a portable electronic device, comprising:

a secondary battery voltage monitoring circuit for detecting a voltage of a secondary battery;

a monitoring circuit having a microcomputer for receiving an output of the secondary battery voltage monitoring circuit and calculating a battery state, a switch element connected between the secondary battery and an external connection load/charge terminal for controlling the charge/discharge state of the secondary battery under control of the microcomputer, and a regulator for supplying a regulated voltage to the microcomputer and the secondary battery voltage monitoring circuit;

a voltage change-over circuit connected between the secondary battery and the external connection load/charge terminal for supplying a voltage to the regulator selected by selecting the higher voltage of a voltage at the external connection terminal and the secondary battery voltage; and a voltage detecting circuit for detecting the output voltage of the regulator and suspending operation of the microcomputer if the output voltage of the regulator is smaller than a predetermined voltage.

* * * * *